United States Patent
Fujishima et al.

(10) Patent No.: US 6,810,360 B2
(45) Date of Patent: Oct. 26, 2004

(54) MACHINE TOOL PERFORMANCE EVALUATION APPARATUS AND PERFORMANCE EVALUATION SYSTEM EQUIPPED WITH THE SAME

(75) Inventors: Makoto Fujishima, Yamatokoriyama (JP); Yoshiaki Akamatsu, Yamatokoriyama (JP)

(73) Assignees: Mori Seiki Co., LTD, Yamatokoriyama (JP); Intelligent Manufacturing Systems International, Sacramento, CA (US)

( * ) Notice: Subject to any disclaimer, the term of this patent is extended or adjusted under 35 U.S.C. 154(b) by 135 days.

(21) Appl. No.: 10/260,408

(22) Filed: Oct. 1, 2002

(65) Prior Publication Data

US 2003/0065481 A1 Apr. 3, 2003

(30) Foreign Application Priority Data

Oct. 2, 2001 (JP) ........................................ 2001-306324

(51) Int. Cl.$^7$ .............................................. G06F 19/00
(52) U.S. Cl. .......................... 702/182; 700/174; 700/175
(58) Field of Search ............................ 702/182, 33, 24, 702/35, 36, 152, 153, 183, 184, 185; 703/2, 7; 700/95, 96, 97, 98, 117, 118, 159, 160, 174, 175, 182

(56) References Cited

U.S. PATENT DOCUMENTS

| | | | | |
|---|---|---|---|---|
| 5,691,909 A | * | 11/1997 | Frey et al. .................... | 700/159 |
| 5,801,963 A | * | 9/1998 | Sadler et al. .................. | 702/34 |
| 5,808,432 A | * | 9/1998 | Inoue et al. ................... | 318/561 |
| 5,949,685 A | * | 9/1999 | Greenwood et al. ......... | 700/193 |
| 6,269,284 B1 | * | 7/2001 | Lau et al. ..................... | 700/193 |
| 6,291,959 B1 | * | 9/2001 | Yoshida et al. .............. | 318/569 |
| 6,445,964 B1 | * | 9/2002 | White et al. .................. | 700/61 |
| 6,671,571 B1 | * | 12/2003 | Matsumiya et al. ......... | 700/172 |
| 6,681,145 B1 | * | 1/2004 | Greenwood et al. ......... | 700/193 |
| 2002/0082742 A1 | * | 6/2002 | Kadono ....................... | 700/160 |
| 2002/0138167 A1 | * | 9/2002 | Uchida et al. ................ | 700/98 |
| 2002/0152000 A1 | * | 10/2002 | Landers et al. ............... | 700/98 |
| 2003/0004596 A1 | * | 1/2003 | Landers et al. ............... | 700/98 |
| 2003/0040824 A1 | * | 2/2003 | Feige et al. .................. | 700/105 |
| 2003/0045964 A1 | * | 3/2003 | Lottgen et al. ............... | 700/180 |
| 2003/0125828 A1 | * | 7/2003 | Corey ......................... | 700/186 |
| 2003/0171842 A1 | * | 9/2003 | Teramoto et al. ........... | 700/182 |
| 2003/0204285 A1 | * | 10/2003 | Thomas et al. .............. | 700/182 |
| 2003/0204286 A1 | * | 10/2003 | Thomas et al. .............. | 700/182 |

OTHER PUBLICATIONS

Patent Abstracts of Japan Publication No. 7-160909 dated Jun. 23, 1995.

(List continued on next page.)

*Primary Examiner*—Patrick J. Assouad
(74) *Attorney, Agent, or Firm*—Westerman, Hattori, Daniels & Adrian, LLP

(57) ABSTRACT

The present invention relates to a performance evaluation system constructed to efficiently collect and accumulate analysis conditions for use in three dimensional model analysis. The performance evaluation system 50 is constructed by connecting a plurality of performance evaluation apparatuses 1 provided in each machine tool to a management apparatus 52 via a network 51. Each performance evaluation apparatus 1 comprises an analysis data storing section 12 in which model data and condition data are stored, a detecting device 4 which detects actual performance, an analyzing section 13 which analyzes the performance, an evaluation determining section 15 which evaluates the correctness of the analyzed performance data, and a data updating section 16 which changes and updates the model data and the condition data. The management apparatus 52 comprises an analysis data accumulating section 61 which accumulates the model data and condition data received from the performance evaluation apparatus 1.

3 Claims, 6 Drawing Sheets

OTHER PUBLICATIONS

Patent Abstracts of Japan Publication No. 9–311883 dated Dec. 2, 1997.
Patent Abstracts of Japan Publication No. 5–088709 dated Apr. 9, 1993.
Patent Abstracts of Japan Publication No. 7–105260 dated Apr. 21, 1995.
Patent Abstracts of Japan Publication No. 2001–147703 dated May 29, 2001.

* cited by examiner

FIG. 3

| PART | PERFORMANCE | ANALYZED DEFORMATION AMOUNT ($\mu m$) | ACTUAL DEFORMATION AMOUNT ($\mu m$) |
|---|---|---|---|
| SPINDLE | THERMAL DEFORMATION AMOUNT OF SPINDLE IN Z-AXIS DIRECTION | 25 | 40 |
| FEED SYSTEM | THERMAL DEFORMATION AMOUNT OF X-AXIS BALL SCREW | 5 | 8 |
| | THERMAL DEFORMATION AMOUNT OF Y-AXIS BALL SCREW | 3 | 6 |
| | THERMAL DEFORMATION AMOUNT OF Z-AXIS BALL SCREW | 10 | 12 |
| STRUCTURE | THERMAL DEFORMATION AMOUNT OF BED | 25 | 20 |
| | THERMAL DEFORMATION AMOUNT OF COLUMN | 15 | 20 |
| | THERMAL DEFORMATION AMOUNT OF TABLE | 15 | 15 |
| | THERMAL DEFORMATION AMOUNT OF SPINDLE HEAD | 20 | 20 |

MACHINE TOOL PERFORMANCE EVALUATION APPARATUS AND PERFORMANCE EVALUATION SYSTEM EQUIPPED WITH THE SAME

BACKGROUND OF THE INVENTION

1. Field of the Invention

The present invention relates to a performance evaluation apparatus for evaluating the performance of a motion mechanism of an NC machine tool, and a performance evaluation system equipped with the same.

2. Description of the Prior Art

In the prior art, when designing a machine tool, it has been practiced to physically produce a trial product based on designed results, evaluate whether the intended functions and performance have been obtained by using the machine tool, and determine the shape and specification of the machine tool as a final product by repeating design changes and trial production until satisfactory results are obtained. Accordingly, the prior art has had the problem that product development takes a long time, leading to an increase in development cost and resulting in a reduction in development efficiency (design efficiency).

To solve this problem, the recent trend is to employ techniques called digital engineering (design techniques implemented by a three dimensional CAD system using a geometric model, three dimensional model analysis techniques implemented by a CAE system, etc.) and perform the design and analysis work based on virtual models wherever possible, thereby minimizing or completely eliminating the physical production of trial products and accomplishing product development in a short time.

However, development using such digital engineering techniques has had the following problems.

That is, in the case of three dimensional model analysis using a computer, the evaluation result obtained from the three dimensional model analysis may not agree with the evaluation result obtained by actually producing a trial machine tool, because of the constraint that the evaluation can be done only under greatly limited analysis conditions or that there is a limit to the degree of accuracy to which the three dimensional model can approximate the actual machine. As a result, there have been cases where satisfactory results cannot be achieved in terms of the shortening of development time, the reduction of development costs, and the improvement of development efficiency which are the intended goals of the digital engineering.

Furthermore, when performing the three dimensional model analysis, analysis conditions assumed in actual use of the machine tool are used but, in actual use of the machine tool, the machine tool may be used under conditions or environments other than those assumed for the analysis, making it difficult to set conditions for the three dimensional model analysis, and on top of that, there are analysis conditions not readily computable; as a result, the evaluation result of the analysis may not agree with the result of the evaluation of the actual machine tool under all use conditions.

The present invention has been devised in view of the above situation, and an object of the invention is to provide a machine tool performance evaluation apparatus configured to efficiently collect and accumulate analysis conditions, etc. for use in three dimensional model analysis, and a performance evaluation system equipped with such the apparatus.

SUMMARY OF THE INVENTION

The present invention which achieves the above object concerns a machine tool performance evaluation apparatus that is provided for an NC machine tool equipped with a numerical controller for controlling operation of a motion mechanism in accordance with an operation command signal, and that evaluates performance of the motion mechanism, comprising:

analysis data storing means for storing three dimensional model data of the motion mechanism and condition data for performance analysis;

detecting means for detecting actual performance of the motion mechanism of the NC machine tool;

analyzing means for analyzing the performance of the motion mechanism, based on the operation command signal in the numerical controller and on the three dimensional model data of the motion mechanism and the condition data for performance analysis stored in the analysis data storing means;

data accumulating means for storing actual performance data of the motion mechanism detected by the detecting means and performance analysis data analyzed by the analyzing means; and evaluation determining means for evaluating the correctness of the performance analysis data by comparing the performance analysis data with the actual performance data of the motion mechanism stored in the data accumulating means.

According to this performance evaluation apparatus, first the analyzing means analyzes the performance of the motion mechanism, such as thermal deformation or deformation due to load, based on the operation command signal in the numerical controller and on the three dimensional model data of the motion mechanism and the condition data for performance analysis stored in the analysis data storing means, and the analyzed performance data is stored in the data accumulating means. On the other hand, the actual performance of the motion mechanism is detected by the detecting means, and the thus detected actual performance data is also stored in the data accumulating means. Next, the evaluation determining means evaluates the correctness of the performance analysis data by comparing the performance analysis data with the actual performance data of the motion mechanism stored in the data accumulating means.

Here, various types of sensor such as a temperature sensor, displacement sensor, acceleration sensor, etc. are used as the detecting means, and a technique such as a finite element method or boundary element method is used as the technique for analysis. The method of evaluating the correctness of the performance analysis data is not specifically limited, but in one example, the evaluation can be done by computing the difference between the performance analysis data and the actual performance data and by determining whether the difference falls within predetermined tolerance limits.

In this way, according to the machine tool performance evaluation apparatus described above, since the correctness of the performance analysis data is evaluated by the evaluation determining means, not only can the reliability of the performance analysis data be confirmed, but the reliability of the three dimensional model data of the motion mechanism and the condition data for performance analysis stored in the analysis data storing means can also be confirmed.

The present invention also concerns a machine tool performance evaluation apparatus further comprising data updating means for updating, in accordance with the result of the evaluation in the evaluation determining means, the data stored in the analysis data storing means so that the performance analysis data becomes correct when the evaluation result shows that the performance analysis data is not correct.

According to this performance evaluation apparatus, when the evaluation result shows that the performance analysis data is not correct, the three dimensional model data of the motion mechanism and the condition data for performance analysis stored in the analysis data storing means are appropriately changed and updated by the data updating means so that the performance analysis data becomes correct.

In this way, according to this invention, since the three dimensional model data of the motion mechanism and the condition data for performance analysis stored in the analysis data storing means are appropriately changed and updated so that the performance analysis data becomes correct, highly reliable three dimensional model data and condition data that match the actual machine can be efficiently obtained, and the accuracy of analysis can be enhanced.

The present invention also concerns a performance evaluation system constructed by connecting the above performance evaluation apparatus to a management apparatus via a network, wherein the management apparatus comprises analysis data accumulating means for accumulating the three dimensional model data of the motion mechanism and the condition data for performance analysis, and the three dimensional model data of the motion mechanism and the condition data for performance analysis stored in the analysis data storing means and updated by the data updating means are transmitted at regular or irregular intervals to the management apparatus via the network and accumulated in the analysis data accumulating means.

According to this performance evaluation system, the three dimensional model data of the motion mechanism and the condition data for performance analysis stored in the analysis data storing means and appropriately changed and updated by the data updating means are transmitted at regular or irregular intervals from the machine tool performance evaluation apparatus to the management apparatus via the network and accumulated in the analysis data accumulating means provided in the management apparatus.

In this way, according to this performance evaluation system, correct and reliable three dimensional model data and condition data for performance analysis that accurately describe the performance of the NC machine tool can be efficiently collected and accumulated.

When designing a machine tool, if three dimensional model analysis is performed using the three dimensional model data and condition data stored in the analysis data accumulating means, the analysis can be performed extensively even with condition data not assumed or not readily computable in the prior art, and as a result, the accuracy of analysis can be enhanced and the evaluation result of the analysis can be brought closer to the evaluation result of the actual machine tool. Accordingly, satisfactory results can be obtained in terms of the shortening of development time, the reduction of development costs, and the improvement of development efficiency which are the main goals of digital engineering and which could not be achieved with the prior art.

The motion mechanism in the present invention collectively refers to the mechanisms constituting the machine tool excluding the controller, and includes: structures such as a bed, table, spindle, head stock or spindle head, saddle, and column; a feed mechanism comprising a feed screw, nut, feed motor, etc.; a spindle motor; and peripheral devices such as a tool changer and a pallet changer.

BRIEF DESCRIPTION OF THE DRAWINGS

FIG. 3 is an explanatory diagram showing analyzed deformation amount data and actual deformation amount data stored in a data accumulating section according to the embodiment.

DESCRIPTION OF THE PREFERRED EMBODIMENTS

Figure 1:
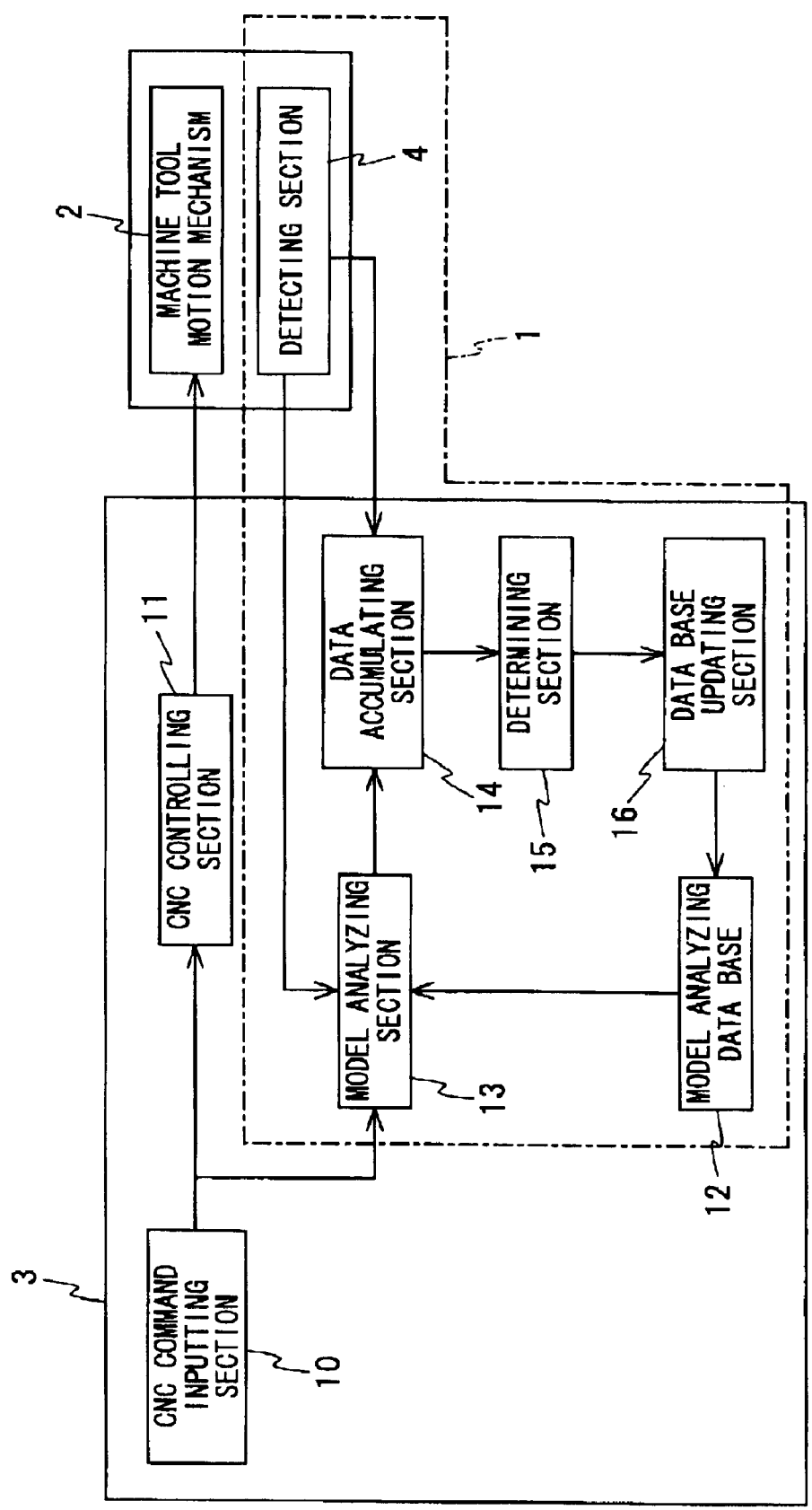
FIG. 1 is a block diagram schematically showing the configuration of a performance evaluation apparatus for a machine tool according to one embodiment of the present invention.

The preferred embodiments of the present invention will be described below with reference to the accompanying drawings. FIG. 1 is a block diagram schematically showing the configuration of a performance evaluation apparatus for a machine tool according to one embodiment of the present invention.

As shown in FIG. 1, the performance evaluation apparatus 1 of this embodiment comprises various sections, such as a model analyzing data base 12, a model analyzing section 13, a data accumulating section 14, a determining section 15, and a data base updating section 16, that are contained in a machine tool numerical controller 3, and a detecting section 4 disposed at a suitable position on an NC machine tool motion mechanism (hereinafter simply referred to as the "motion mechanism") 2. Besides the above-enumerated sections, a CNC command inputting section 10, a CNC controlling section 11, etc. are also contained in the numerical controller 3. Here, the performance evaluation apparatus 1 need not necessarily be incorporated into the numerical controller 3, but may be provided separately and connected in a suitable fashion to the numerical controller 3.

The CNC command inputting section 10, the CNC controlling section 11, the model analyzing data base 12, the model analyzing section 13, the data accumulating section 14, the determining section 15, and the data base updating section 16 are each constructed from a CPU, ROM, RAM, hard disk, or the like. The detecting section 4 comprises a temperature sensor such as a thermistor, a non-contacting displacement sensor of eddy current type or capacitance type, etc. and detects the ambient temperature and the actual performance of the motion mechanism 2 such as thermal deformation and deformation due to load.

The CNC command inputting section 10 is a processing section that generates operation command signals for the motion mechanism 2 by sequentially analyzing an NC program, and transmits the generated operation command signals to the CNC controlling section 11. The generated operation command signals are also transmitted to the model analyzing section 13.

The motion mechanism 2 is a term that collectively refers to the mechanisms excluding the controller (which includes the numerical controller), and its constituent elements differ according to the type of machine tool. For example, in the case of a lathe, the motion mechanism includes structures such as a bed, head stock, saddle, and tool rest, X-axis and Z-axis feed mechanisms comprising ball screws, ball nuts, and feed motors, a spindle motor, and peripheral devices such as a tool changer. In the case of a machining center, the motion mechanism includes structures such as a bed, table, spindle head, and column, X-axis, Y-axis, and Z-axis feed mechanisms, a spindle motor, and peripheral devices such as a tool changer and a pallet changer.

The CNC controlling section 11 is a processing section that generates drive command signals by processing the operation command signals received from the CNC command inputting section 10, and that transmits the thus generated drive command signals to the servo motor and spindle motor of the motion mechanism 2. Work is machined while controlling the servo motor and spindle motor by the thus generated and transmitted drive command signals.

Figure 2:
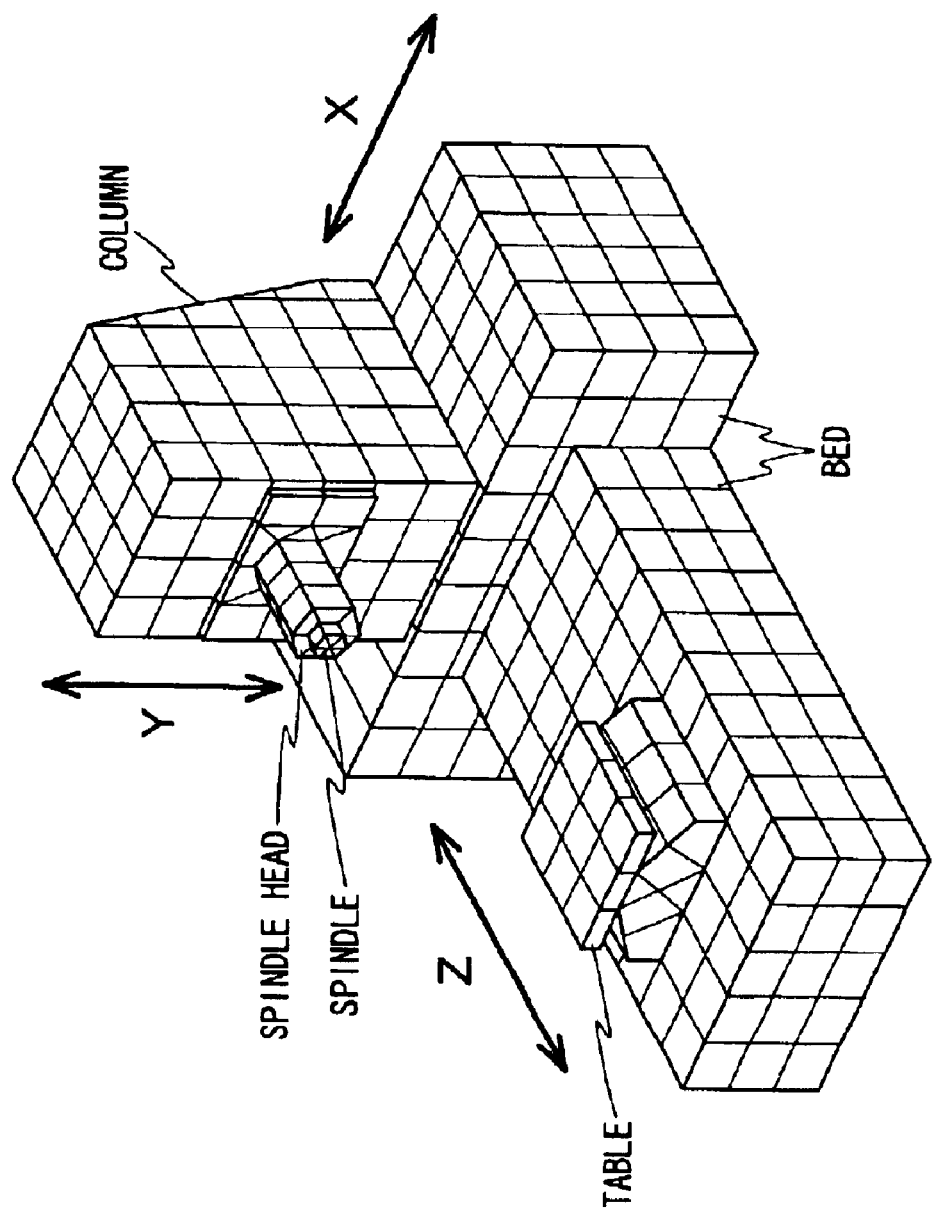
FIG. 2 is a perspective view showing three dimensional model data of a motion mechanism according to the embodiment.

Three dimensional model data of the motion mechanism 2, such as shown in FIG. 2, and various condition data for performance analysis are prestored in the model analyzing data base 12, and the model analyzing section 13 analyzes the performance of the motion mechanism 2, such as thermal deformation and deformation due to load, based on the operation command signal received from the CNC command inputting section 10, on the data (for example, ambient temperature data) detected by the detecting section 4, and on the three dimensional model data and condition data stored in the model analyzing data base 12. A technique such as a finite element method or boundary element method is used as the technique for analysis.

The three dimensional model data shown in FIG. 2 relates to a horizontal machining center comprising a bed, column, table, spindle head, spindle, and feed axes (X-axis, Y-axis, and Z-axis), and is generated by suitably dividing three dimensional shape data, input using a three dimensional CAD system such as CATIA or UNIGRAPHICS, into fine elements and by translating them into the model data necessary for analysis. The condition data for performance analysis comprises physical properties intrinsic to the material forming the NC machine tool, such as thermal conductivity, linear expansion coefficient, Young's modulus, and Poisson's ratio, and the coefficient of heat transfer between that material and the atmosphere.

For example, in the case of thermal analysis, the NC machine tool has heat generating sources represented by the servo motor and nut in the feed system and the spindle motor and bearing in the spindle unit; therefore, based on the operation command signal, that is, the rotational speed or other parameter of each individual heat generating source, the model analyzing section 13 first obtains the amount of heat generated by that heat generating source and, based on the amount of generated heat, obtains the temperature distribution for each element. Then, based on the temperature distribution thus obtained, the amount of thermal deformation is computed for each element, from which the amount of thermal deformation is computed for each part such as the spindle, the X-axis, Y-axis, and Z-axis ball screws, the bed, the column, the table, the spindle head, etc.

Performance analysis data analyzed by the model analyzing section 13 is stored in the data accumulating section 14, and the actual performance data detected by the detecting section 4 is also stored in the data accumulating section 14. FIG. 3 shows an example of the stored data. The example of FIG. 3 shows the performance data concerning the thermal deformations of the various parts of the motion mechanism 2 (the amount of thermal deformation of the spindle in the Z-axis direction, the amount of thermal deformation of the X-axis ball screw, the amount of thermal deformation of the Y-axis ball screw, the amount of thermal deformation of the Z-axis ball screw, the amount of thermal deformation of the bed, the amount of thermal deformation of the column, the amount of thermal deformation of the table, and the amount of thermal deformation of the spindle head).

The determining section 15 compares the performance analysis data stored in the data accumulating section 14 with the actual performance data to compute the difference between them and, based on whether the difference falls within predetermined tolerance limits, evaluates the correctness of the performance analysis data, that is, the acceptability of the performance analysis data.

If the result of the evaluation in the determining section 15 shows not acceptable, the data base updating section 16 performs update processing by appropriately changing the three dimensional model data of the motion mechanism 2 and the condition data for performance analysis stored in the model analyzing data base 12 so that the difference computed in the determining section 15 falls within the tolerance limits. For example, in the case of thermal analysis, the three dimensional model data and the condition data are changed and updated by increasing or decreasing the number of elements in the three dimensional model data, the heat transfer coefficient in the condition data, etc. by a prescribed percentage.

Figure 4:
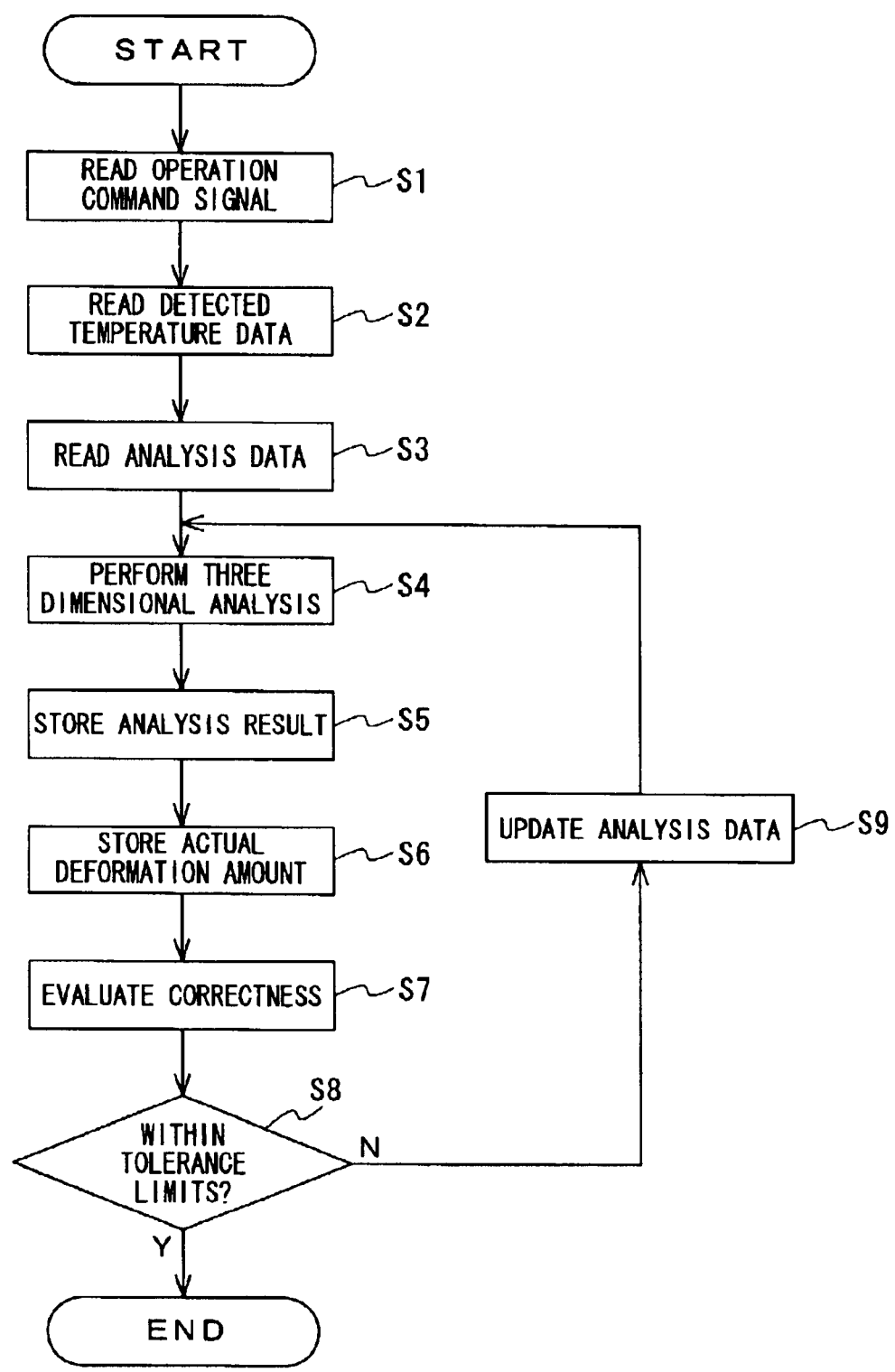
FIG. 4 is a flow chart illustrating the sequence of processing performed in the performance evaluation apparatus according to the embodiment.

The sequence of processing performed in the performance evaluation apparatus 1 of the above embodiment will be described in detail below with reference to FIG. 4. FIG. 4 is a flow chart illustrating the sequence of processing performed in the machine tool performance evaluation apparatus 1 according to the embodiment, and an example of performance analysis will be described by taking thermal deformation as one example of the machine tool performance.

First, the operation command signal generated by the CNC command inputting section 10 is received by the model analyzing section 13 (step S1), and then, the detected temperature data detected by the detecting section 4 is received (step S2). The detected temperature data received at this time represents the ambient temperature of the NC machine tool, which is detected by a temperature sensor disposed at a suitable position on the machine tool motion mechanism 2.

Further, the model analyzing section 13 reads the three dimensional model data of the motion mechanism 2 and the condition data for performance analysis prestored in the model analyzing data base 12 (step S3). Here, the three dimensional model data is the model data relating to a horizontal machining center such as shown in FIG. 2, and the condition data is the data consisting of thermal conductivity, linear expansion coefficient, Young's modulus, Poisson's ratio, heat transfer coefficient, etc.

Based on the operation command signal, the detected temperature data, the three dimensional model data, and the condition data thus read into the model analyzing section 13, three dimensional thermal analysis is performed using a finite element method, to obtain the performance data such as the amount of thermal deformation of the spindle in the Z-axis direction, the amount of thermal deformation of the X-axis ball screw in the axial direction, the amount of thermal deformation of the Y-axis ball screw in the axial direction, the amount of thermal deformation of the Z-axis ball screw in the axial direction, the amount of thermal deformation of the bed, the amount of thermal deformation of the column, the amount of thermal deformation of the table, and the amount of thermal deformation of the spindle head (step S4). Then, the analyzed deformation amount data obtained from the analysis in the model analyzing section 13 is stored in the data accumulating section 14 (step S5), and the detected deformation amount (actual deformation amount) data detected on each part by the detecting section 4 is also stored in the data accumulating section 14 (step S6).

Figure 5:
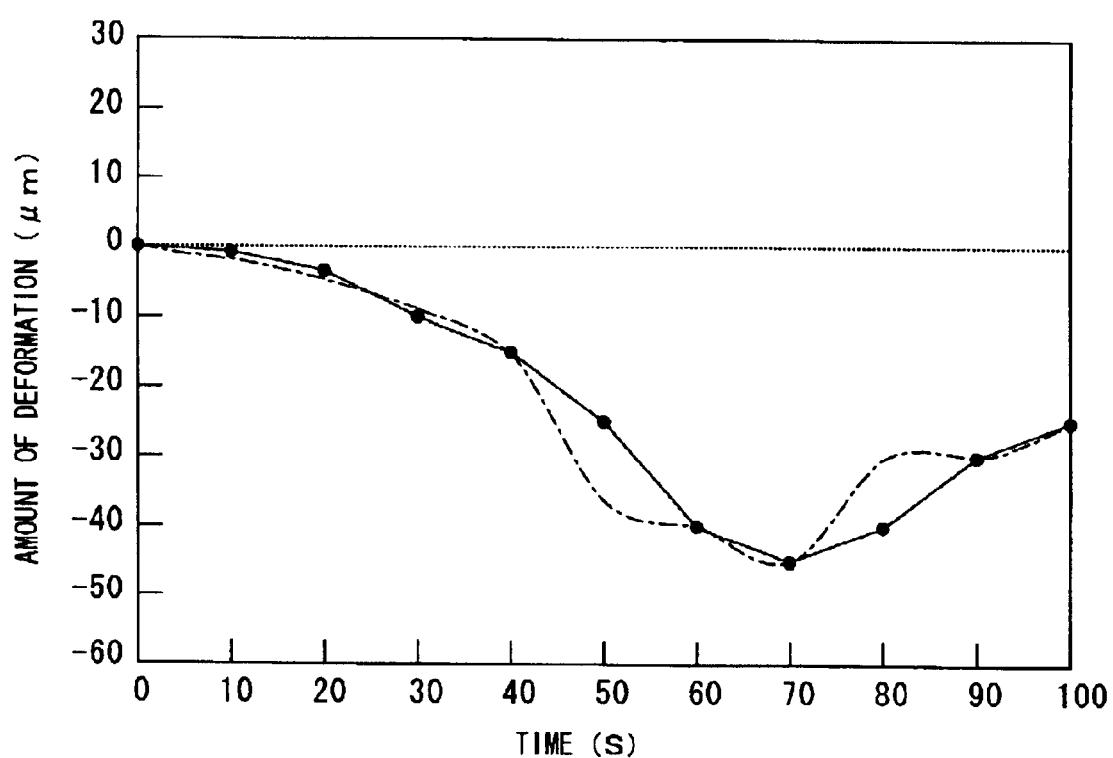
FIG. 5 is a graph showing one example of the analyzed amount of thermal deformation versus the actual amount of thermal deformation of a spindle in Z-axis direction.

Next, in the determining section 15, the analyzed deformation amount data is compared with the actual deformation amount data to compute the difference between them, and it is determined whether the difference falls within the predetermined tolerance limits, thereby evaluating the correctness of the analyzed deformation data, that is, the acceptability of the performance analysis data (step S7). For reference, FIG. 5 shows the analyzed amount of deformation (continuous line) versus the actual amount of deformation (chain line) as one example concerning the amount of thermal deformation of the spindle in the Z-axis direction.

In this example, a large difference is observed near 50-second position and also near 80-second position between the analyzed amount of deformation and the actual amount of deformation; if the difference is outside the tolerance limits, the determining section 15 determines that the result of the analysis is not acceptable because the result of the analysis does not agree with the actual data.

Next, the data base updating section 16 checks whether the result of the evaluation in the determining section 15 is acceptable or not acceptable (step S8), and if the result is not acceptable, the number of element divisions in the three dimensional model data, the heat transfer coefficient in the condition data, etc. are increased or decreased by a prescribed percentage, thereby changing and updating them accordingly (step S9).

Then, the process from the step S4 onward is repeated, and the three dimensional model data and condition data stored in the model analyzing data base 12 are changed and updated as necessary until it is determined in the determining section 15 that the analyzed deformation amount data is correct (step S9) and, when the determining section 15 determines that the analyzed deformation amount data is correct, the process is terminated (step S8). If the evaluation result is determined to be acceptable in the first determination cycle by the determining section 15, in this case also the process is terminated (step S8).

Here, the analyzed deformation amount data and detected deformation amount data stored in the data accumulating section 14 can be displayed or output as needed on a display device or output device not shown.

As described in detail above, according to the performance evaluation apparatus 1 of the above embodiment, the model analyzing section 13 analyzes the performance of the motion mechanism 2 based on the operation command signal transmitted from the CNC command inputting section 10, on the three dimensional model data of the motion mechanism 2 and the condition data for performance analysis stored in the model analyzing data base 12, and on the data (ambient temperature data) detected by the detecting section 4, and the determining section 15 evaluates the correctness of the performance analysis data.

If it is determined that the analyzed performance data is not correct, the three dimensional model data and condition data stored in the model analyzing data base 12 are changed and undated as necessary by the data base updating section 16 until it is determined that the analyzed performance data is correct.

In this way, according to the above performance evaluation apparatus 1, since the three dimensional model data of the motion mechanism 2 and the condition data for performance analysis stored in the model analyzing data base 12 are appropriately changed and updated so that the analyzed performance data will be evaluated as being correct, that is, the difference will fall within the tolerance limits, correct and highly reliable three dimensional model data and condition data can be obtained efficiently, and the accuracy of analysis can be enhanced.

Figure 6:
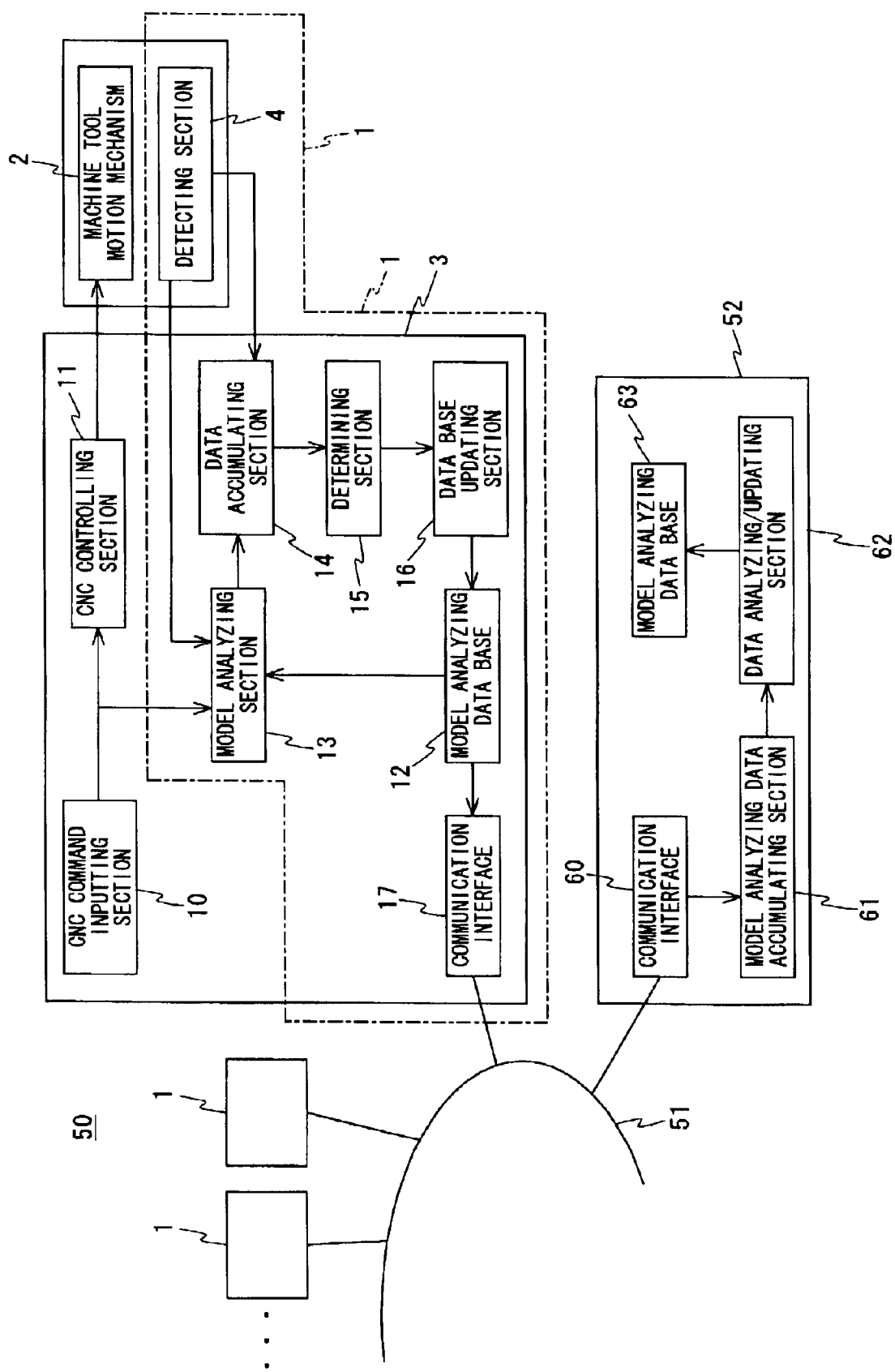
FIG. 6 is a block diagram schematically showing the configuration of a performance evaluation system according to another embodiment of the present invention.

Next, another embodiment of the present invention will be described. FIG. 6 is a block diagram schematically showing the configuration of a performance evaluation system according to that other embodiment.

As shown in FIG. 6, the performance evaluation system 50 of this embodiment is constructed by connecting a plurality of performance evaluation apparatuses 1, each identical to the one shown in the foregoing first embodiment, to a management apparatus 52 via a network 51 such as the Internet.

Each performance evaluation apparatus 1 is equipped with a communication interface 17, and is connected to the network 51 via the communication interface 17, and the three dimensional model data of the motion mechanism 2 and the condition data for performance analysis appropriately changed and updated by the data base updating section 16 and stored in the model analyzing data base 12 are transmitted at regular or irregular intervals to the management apparatus 52 via the network 51.

The management apparatus 52 comprises a communication interface 60, a model analyzing data accumulating section 61, a data analyzing/updating section 62, and a model analyzing data base 63; here, the communication interface 60, the model analyzing data accumulating section 61, the data analyzing/updating section 62, and the model analyzing data base 63 are each constructed from a CPU, ROM, RAM, hard disk, or the like. The management apparatus 52 is installed in a machine tool maker or in a consulting firm that provides consultation about machining.

The model analyzing data accumulating section 61 is a functional section which sequentially accumulates the three dimensional model data of the motion mechanism 2 and the condition data for performance analysis transmitted from each performance evaluation apparatus 1, and stores these data for each performance evaluation apparatus 1.

The model analyzing data base 63 is a functional section which stores the three dimensional model data of the motion mechanism 2 and the condition data for performance analysis, and the three dimensional model data and condition data stored in the model analyzing data base 63 are used for model analysis in the development and design of products at the machine tool maker.

The data analyzing/updating section 62 is a processing section which analyzes the three dimensional model data and condition data stored and accumulated in the model analyzing data accumulating section 61 and, based on the result of the analysis, updates the data stored in the model analyzing data base 63. More specifically, the data accumulated in the model analyzing data accumulating section 61 and the data stored in the model analyzing data base 63, for example, are compared with each other at regular intervals, and if there is any data that is stored in the model analyzing data accumulating section 61 but not stored in the model analyzing data base 63, the data is additionally stored in the model analyzing data base 63.

According to the above performance evaluation system 50, since the three dimensional model data of the motion mechanism 2 and the condition data for performance analysis appropriately changed and updated in each performance evaluation apparatus 1 are transmitted at regular or irregular intervals to the management apparatus 52 via the network 51, optimized and highly reliable three dimensional model data and condition data can be efficiently collected and accumulated at the management apparatus 52.

In this way, since three dimensional model analysis can be performed using the thus optimized and highly reliable three dimensional model data and condition data in the development and design of a machine tool, highly accurate analysis can be achieved, and the evaluation result of the analysis can be brought closer to the actual evaluation result of the machine tool. Accordingly, satisfactory results can be obtained in terms of the shortening of development time, the reduction of development costs, and the improvement of development efficiency which are the main goals of digital engineering and which could not be achieved with the prior art. Furthermore, the analysis can also be performed extensively even with condition data not assumed or not readily computable in the prior art.

The preferred embodiments of the present invention have been described above, but it will be appreciated that the specific modes that can carry out the present invention are by no means limited to those described above.

For example, the first embodiment has been described by taking thermal deformation as one example of the performance analysis, but the above description is not restrictive, and the apparatus may be configured to perform analysis on the deformation of the motion mechanism 2 or work due to load or on the vibration of the motion mechanism 2.

Further, in the first embodiment, the determining section 15 has been described as evaluating the correctness of the performance analysis data; in this case, if the result is judged to be not correct, then based on whether the difference continuously falls outside the tolerance limits, a determination may be made as to whether the cause is the incorrectness of the performance analysis data or an abnormality in the machine tool motion mechanism 2. If the cause is determined to be the abnormality of the machine tool motion mechanism 2, an alarm section (not shown) in the numerical controller 3 issues an alarm.

In the second embodiment, data transfers between each performance evaluation apparatus 1 and the management apparatus 52 can be performed not only via the network 51, but also via a portable recording medium such as a floppy disk or a CD-ROM.

What is claimed is:

1. A machine tool performance evaluation apparatus which is provided for an NC machine tool equipped with a numerical controller for controlling operation of a motion mechanism in accordance with an operation command signal, and which evaluates performance of said motion mechanism, comprising:

analysis data storing means for storing three dimensional model data of said motion mechanism and condition data for performance analysis;

detecting means for detecting actual performance of said motion mechanism of said NC machine tool;

analyzing means for analyzing the performance of said motion mechanism, based on said operation command signal in said numerical controller and on the three dimensional model data of said motion mechanism and the condition data for performance analysis stored in said analysis data storing means;

data accumulating means for storing actual performance data of said motion mechanism detected by said detecting means and performance analysis data analyzed by said analyzing means; and evaluation determining means for evaluating the correctness of said performance analysis data by comparing said performance analysis data with the actual performance data of said motion mechanism stored in said data accumulating means.

2. A machine tool performance evaluation apparatus according to claim 1, further comprising data updating means for updating, in accordance with the result of the evaluation in said evaluation determining means, the data stored in said analysis data storing means so that said performance analysis data becomes correct when said evaluation result shows that said performance analysis data is not correct.

3. A performance evaluation system constructed by connecting a machine tool performance evaluation apparatus according to claim 2 to a management apparatus via a network, wherein said management apparatus comprises analysis data accumulating means for accumulating the three dimensional model data of said motion mechanism and the condition data for performance analysis, and the three dimensional model data of said motion mechanism and the condition data for performance analysis stored in said analysis data storing means of said performance evaluation apparatus and updated by said data updating means are transmitted at regular or irregular intervals to said management apparatus via said network and accumulated in said analysis data accumulating means.

\* \* \* \* \*